United States Patent
Stephany et al.

(10) Patent No.: US 6,442,350 B1
(45) Date of Patent: Aug. 27, 2002

(54) CAMERA WITH SOUND RECORDING CAPABILITY

(75) Inventors: Thomas M. Stephany, Churchville; Bryan D. Bernardi, Webster, both of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/542,574

(22) Filed: Apr. 4, 2000

(51) Int. Cl.$^7$ .............................................. G03B 17/24
(52) U.S. Cl. ...................................................... 396/312
(58) Field of Search ......................................... 396/312

(56) References Cited

U.S. PATENT DOCUMENTS

| | | | |
|---|---|---|---|
| 4,570,250 A | 2/1986 | Gabritsos et al. | 369/97 |
| 4,983,996 A | 1/1991 | Kinoshita | 354/76 |
| 5,128,700 A | 7/1992 | Inoue et al. | 354/76 |
| 5,276,472 A * | 1/1994 | Bell et al. | 396/312 |
| 5,387,955 A * | 2/1995 | Cocca | 396/59 |
| 5,644,557 A | 7/1997 | Akamine et al. | 369/14 |
| 5,655,164 A * | 8/1997 | Tsai | 396/312 |
| 5,692,225 A * | 11/1997 | Bernardi et al. | 396/318 |
| 5,784,525 A * | 7/1998 | Bell | 386/107 |

* cited by examiner

Primary Examiner—David M. Gray
Assistant Examiner—Michelle Nguyen
(74) Attorney, Agent, or Firm—David M. Woods

(57) ABSTRACT

A camera includes a microphone for generating audio signals, a memory separate from the film for storing the audio signals, a generator for generating for each film frame a unique identification signal that is synchronized to advance of the film in the camera, and a processor for embedding the unique identification signal with the audio signal in the memory. More specifically, the unique identification signal is a tone signal, and in particular a DTMF tone signal. Furthermore, a photofinishing system receives the audio signal together with the unique identification signal embedded in each audio signal that identifies the frame to which the audio signal pertains. A decoder decodes the unique signal embedded in each audio signal and a processor thereupon associates the audio signal with a particular frame of film by reference to the decoded unique tone signal. Finally, a transfer mechanism transfers the audio signal to an output product, such as a print, associated with each particular frame of film.

33 Claims, 3 Drawing Sheets

CAMERA WITH SOUND RECORDING CAPABILITY

FIELD OF THE INVENTION

This invention relates generally to the field of photographic still cameras, and more particularly to photographic cameras and photofinishing systems for providing audio recording and playback in association with individual still photographic prints.

BACKGROUND OF THE INVENTION

Cameras and systems for providing audio recording and playback in association with individual photographic still prints are known in the art. An example of such a system is disclosed in U.S. Pat. No. 5,276,472, which describes a still photographic system with audio recording capability. In the '472 patent, audio to be recorded in a photographic film camera in association with individual exposed frames is first digitized and stored in a temporary storage memory in the camera, which allows playback through a speaker mounted in the camera to permit review and editing, as needed. When the film is advanced in the camera to the next exposure frame, the digital audio signal is recorded in a magnetic layer formed on the film. At the photofinisher, the digital audio signal is read from the film and converted to a suitable format, such as a bar code or binary coded blister marks, which are impressed on the photoprint for subsequent playback. Additionally, there are other known techniques for imprinting data, including sound related data, on a still image original in the form of machine-readable code. An example of such an arrangement is disclosed in U.S. Pat. No. 4,570,250.

Cameras and systems for providing audio recording and storing voice messages in message memory in association with individual exposed image frames are also known in the art. Examples of such systems are disclosed in U.S. Pat. Nos. 5,692,225 and 5,128,700. The '225 patent describes a system in which messages are stored in camera on-board memory or in detachable message memory modules or cards to be forwarded with the exposed film strip to a photofinisher for read out and printing on the prints. Maintaining the association between the sound and the film frame is a problem in such systems. In the '700 patent, the sound data is recorded in a first memory (e.g., a sound IC card) and data indicating correspondence between the photographed frames of a film and the sound data respectively is recorded in a second memory (e.g., a film).

A disadvantage in the implementation of a system such as disclosed in the '472 patent is that it requires the design and production of an entirely new film format to record the sound data supplied by the camera user, that is, a film format with a magnetic film track which spatially associates the recorded sound with the film frame. This fact makes implementation both technically prohibitive and costly. The '700 patent requires recording of associative data on each film frame. Additionally, the '472 and '700 patents require the use of some type of a recording device within the camera to place the required information upon the film frame. This requirement places significant cost and technical complexity upon the camera, thus making implementation of the technology on a cost basis even more unlikely.

Consequently, there exists a need for a device which provides a still camera with the capability of recording and reviewing recorded information, indexes that recorded information as an easily retrievable reference to a given camera frame, utilizes an existing film format and also reduces camera and overall system costs.

SUMMARY OF THE INVENTION

The present invention is directed to overcoming one or all of the drawbacks set forth above. Briefly summarized, according to one aspect of the present invention, the invention resides in a camera for recording sound associated with images that are captured on frames of a photographic film. The camera includes a microphone for generating audio signals, a memory separate from the film for storing the audio signals, a generator for generating for each film frame a unique identification signal that is synchronized to advance of the film in the camera, and a processor for embedding the unique identification signal with the audio signal in the memory. More specifically, the unique identification signal is a tone signal, and in particular a DTMF tone signal.

The invention further resides in a photofinishing system for producing prints from photographic film having sound associated with images that are captured on frames of the film. The photofinishing system includes means for processing the film and producing prints therefrom; means for receiving a sound output, where the sound output is recorded as an audio signal on a memory separate from the film together with a unique tone identification signal embedded in each audio signal that identifies the frame to which the audio signal pertains. A decoder decodes the unique signal embedded in each audio signal and a processor thereupon associates the audio signal with a particular frame of film by reference to to the decoded unique tone signal. Finally, a transfer mechanism transfers the audio signal to an output product, such as a print, associated with each particular frame of film.

The advantage of the invention is that it provides means for associating audio information with a particular camera frame number without any requirement for a special film or the use of a recording head. This is accomplished by the use of an electronic counter within the camera, which transforms the actuation of the camera shutter into a sequential electronic count. That electronic count, which is representative of the number of exposed frames on the film strip, is embedded within the audio information in such a manner as to be easily decoded at the photofinisher.

These and other aspects, objects, features and advantages of the present invention will be more clearly understood and appreciated from a review of the following detailed description of the preferred embodiments and appended claims, and by reference to the accompanying drawings.

PREFERRED EMBODIMENT

Because photographic cameras and systems employing sound recording are well known, the present description will be directed in particular to elements forming part of, or cooperating more directly with, apparatus in accordance with the present invention. Elements not specifically shown or described herein may be selected from those known in the art. In that connection, the disclosures of the aforementioned U.S. Pat. Nos. 5,692,225, 5,276,472 and 5,128,700 are herein incorporated in their entirety by reference.

Figure 1:
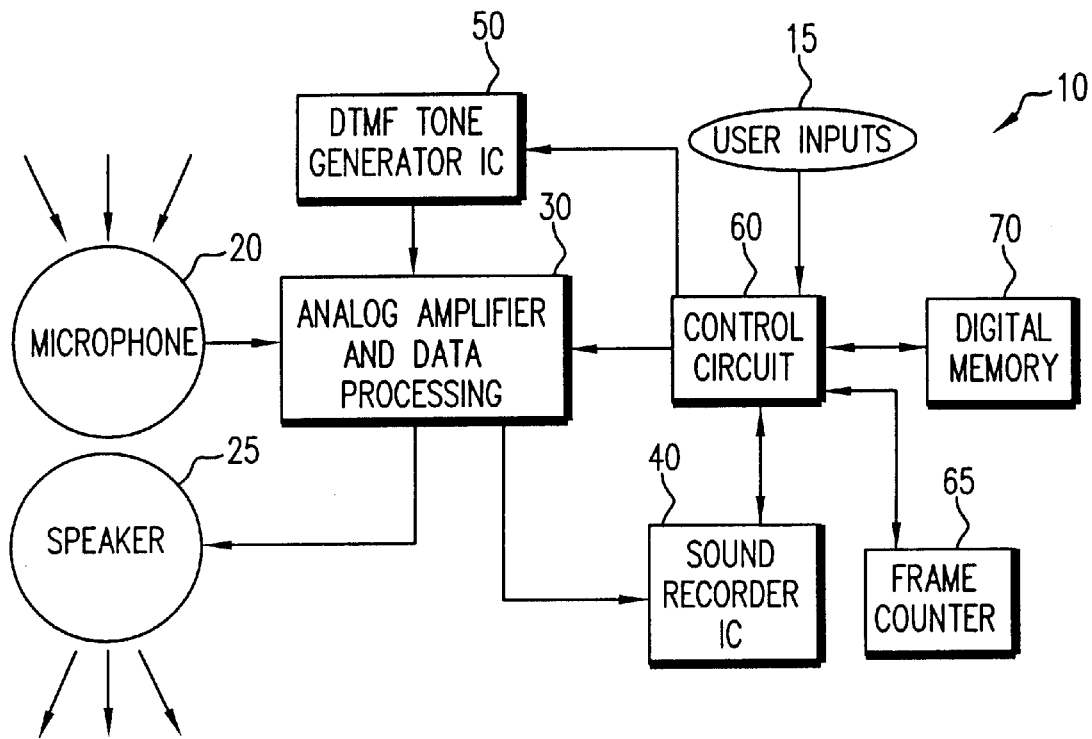
FIG. 1 is a block diagram showing a sound recording camera according to the invention.

Referring now to FIG. 1, a block diagram of a sound recording camera 10 is shown with a microphone 20 for inputting of audio information and a speaker 25 for playback of the audio information. User inputs 15 are shown and represent a camera shutter button 80, a record button 90, a play button 100, and a store button 110, which are detailed in FIG. 2. The microphone 20 is connected to an analog amplifier and data processing section 30, which conditions the audio information for a sound recorder integrated circuit (IC) 40. The sound recorder IC 40, which has built in memory for storing audio information, is a commercially available recording chip, such as an Integrated Silicon Device (ISD) 2564 recording chip, which stores audio information as an analog record. A conventional dual tone modulation frequency (DTMF) tone generator 50 is also connected to the amplifier and data processing section 30 for the purpose of adding a DTMF tone to the beginning of an audio record. (The DTMF tone generator 50 is a part conventionally used to produce a numeric tone signal in a touch tone telephone, such as National Semiconductor part TP5088WM.) The function of the DTMF tone generator is to create a unique identification signal for each audio record that is also uniquely associated with each film frame, that is, a unique tone signal that is numerically synchronized with each film frame. In addition, a control circuit 60 sets the timing for the circuitry and executes recording of the audio record with the applied. DTMF tone. A frame counter 65 represents the current frame number, and is controlled by the control circuit 60. A digital memory 70, while not necessary for the preferred embodiment, is shown to illustrate that the sound record could be stored as digital information. Furthermore, the digital memory 70 may be configured so as to be removable from the camera 10.

Figure 2:
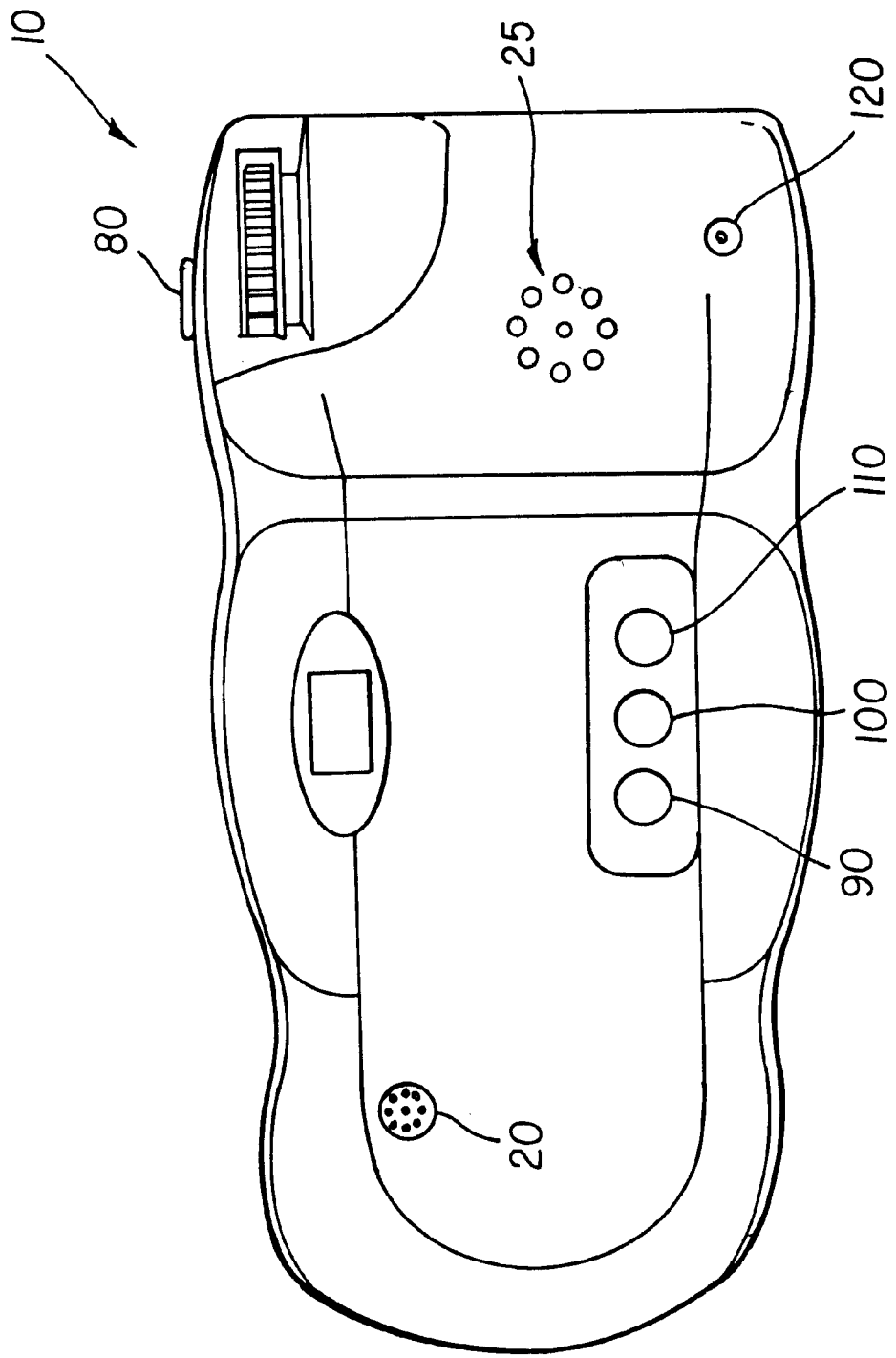
FIG. 2 is a perspective drawing of the camera described in FIG. 1, showing a microphone and various controls.

Referring now to FIG. 2, a perspective drawing of the sound recording camera 10 is shown. Upon taking a picture using the shutter button 80, the user is allowed to record a sound record. Simultaneously, upon pressing the shutter button 80, the film frame counter 65 is incremented. If audio recording is desired for the current film frame, the user presses the record button 90, then is alerted by a tone through the speaker 25, and begins speaking into the microphone 20. The alerting tone is the DTMF tone, which is generated by the DTMF tone generator 50 and which represents the frame number currently being used by the camera 10. Additionally, the DTMF tone is the beginning of the sound record the user is recording. The user is allowed to speak for a pre-determined length of time, calculated, for example, by the full storage capacity of the sound recorder IC 40, divided by the number of film frames within the camera 10. It should be understood that an alternate embodiment could allow the user a variable length of recording time per frame, obviously not to exceed the total capacity of the sound recorder IC 40. Upon completion of recording, the sound record, along with its associated DTMF tone, is stored in sound recorder IC 40.

The user then has the ability to review the information that he has just recorded by pressing the play button 100. Furthermore, the user can replace the current recording with a new one by pressing record button 90, as outlined previously. The user can continue this process indefinitely by repeating this procedure until the annotation is satisfactory; then, by pressing the store button 110, the user commits the record into the sound recorder IC 40. An audio output jack 120 serves as an output for transferring the audio records into the photo finishing chain. It should be understood that an additional embodiment would allow the user to review any of the previously recorded information at any time, and allow the records to be edited at will.

Figure 3:
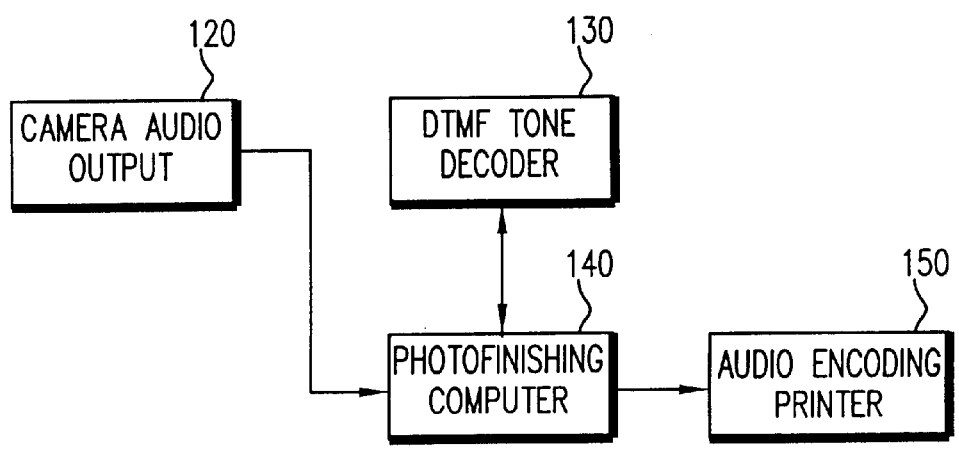
FIG. 3 is a block diagram showing a photofinishing system according to the invention.

Referring now to FIG. 3, there is shown block diagram of a photofinishing system, which is helpful in explaining how the audio information stored in the camera 10 is output to one or more prints. Alternatively, the audio output extracted from the camera 10 may be output to some medium other than a print. Upon connecting a cable from a photofinishing computer 140 to the camera audio output jack 120, the camera 10 will be in a mode for playback of all audio records in one continuous block. The photofinishing computer 140 is ready in a receiving mode, and upon a signal being detected from the camera audio output jack 120, the output of the camera 10 will be placed into a memory (not shown) within the computer 140. Pressing the play button 100 on the camera 10 will initiate the transfer of the continuous block of records within the camera 10 to the photofinishing computer 140.

Referring further to FIG. 3, the photofinishing computer 140 then passes the block of records within its memory to a DTMF tone decoder 130. Such tone decoders are conventionally available in connection with touch tone telephone parts. The decoder 130 then analyzes the DTMF tones within the audio block and associates the sound records, each having a particular record number, with a film frame which has the same corresponding number. These frame numbers are used by the computer 140 in the synchronization of the sound record to its individual print. As each film frame is printed by conventional photofinishing equipment, it is passed through an audio encoding printer 150 which writes the recovered sound record to the print. The computer 140 sends the audio information to the audio encoding printer 150 for the frames for which an audio record exists. In this embodiment, the audio information is stored upon the print in the form of a two dimensional bar code containing digital data representing the audio record. The form of the bar code can be a visible code on a non-imaging portion of the print, or an invisible code anywhere upon the print, either directly on the visible image or a non-imaging portion. Such two dimensional bar code printing for audio information is shown in U.S. Pat. No. 5,644,557, which is incorporated herein by reference.

As previously mentioned, the audio information could be output to another medium other than a print. In an alternate embodiment, the audio encoding printer 150 could be in the form of a CD-Recorder, cassette tape recorder, or other audio recording device; then the user would receive prints along with a CD, tape cassette or other playable medium. Furthermore, in a digital imaging environment where the primary images delivered to the user are digital images (rather than/or in addition to prints), the sound record would be associated with each digital file.

Figure 4:
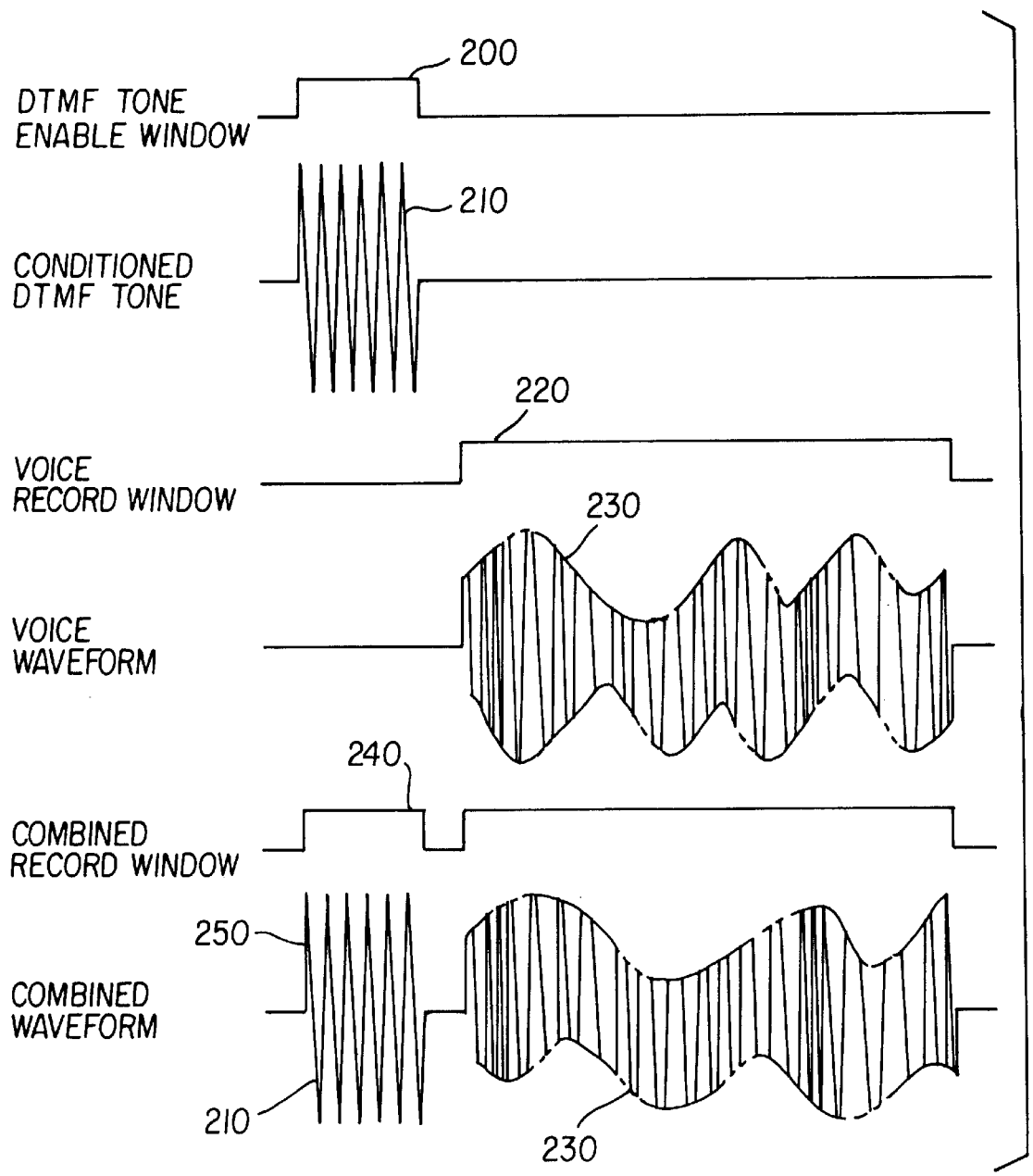
FIG. 4 shows timing diagrams and typical audio waveforms that are helpful in understanding implementation of the invention.

Referring now to FIG. 4, a set of timing and audio waveform diagrams are shown. A DTMF tone enable window 200, which is generated by the control circuit 60, is set to time and enable the application of the DTMF tone to the beginning of an audio record. A conditioned DTMF tone 210 is shown as an example of a DTMF tone conditioned to an appropriate length of time for the beginning of the audio record. Likewise, a voice recording window 220, which is also generated by the control circuit 60, is set to time and enable the audio recording by the user. A voice waveform 230 is shown as an example of an individual audio record conditioned to the appropriate timing. A combined record window 240 diagrams the timing relationship between the tone enable window 200 and the voice recording window 220. A combined waveform 250 represents the conditioned DTMF tone 210 added to the voice waveform 230, with each waveform shown in the proper timing relationship. The combined waveform 250 is a graphical representation of the construction of each audio record.

For purposes of this preferred embodiment a DTMF tone is used, but it should be understood that a multiplicity of methods could ultimately be used to represent this number. Firstly, it should be understood that in order for this invention to be implemented, an electronic counter should be incremented for every exposed frame. In addition, a different tone is to be generated for every exposed frame, thus making a direct association with a particular exposed frame possible. Lastly, the generated identification tone is to be applied only to the sound record that the user generates. This allows the generation of fewer sound records than available camera exposures, thus allowing the user complete control over the creative process. As an example if a user recorded only one sound record over 15 exposures, and that sound record was for exposure seven, the only sound record in the recorder memory would have a number 7 encoded with that record. During processing, the seventh exposed frame would be associated with that particular sound record, and the sound would be placed upon that particular print.

The invention has been described in detail with particular reference to certain preferred embodiments thereof, but it will be understood that variations and modifications can be effected within the spirit and scope of the invention. For instance, while the recording of an audio signal with a unique DTMF frame indication has been disclosed in connection with a photographic film camera, it should be understood that a digital camera could also associate an audio signal with a particular digital image by means of a unique DTMF tone. In this case, the digital audio and its DTMF tone may be stored together with the digital image signal.

PARTS LIST 10 sound recording camera
15 user inputs
20 microphone
25 speaker
30 analog amplifier and data processing section
40 sound recorder IC
50 DTMF generator
60 control circuit
65 frame counter
70 digital memory
80 shutter button
90 record button
100 play button
110 store button
120 audio output jack
130 DTMF tone decoder
140 photofinishing computer
200 DTMF tone enable window
210 conditioned DTMF tone
220 voice recording window
230 voice waveform
240 combined record window
250 combined waveform

What is claimed is:

1. A camera for recording sound associated with images that are captured on frames of a photographic film, said camera comprising:

a microphone for generating audio signals;

a memory separate from the film for storing the audio signals;

a generator for generating for each film frame a unique identification signal that is synchronized to advance of the film in the camera, wherein the unique identification signal is a tone signal; and a processor for embedding the unique identification signal with the audio signal in the memory.

2. The camera as claimed in claim 1 further comprising a film frame counter for counting each frame of film, wherein the generator is responsive to the incrementing of the film frame counter for generating the unique identification signal for each film frame.

3. The camera as claimed in claim 1 further comprising a user input for indicating a user desire to record an audio signal, wherein the processor is responsive to the user input for embedding the unique identification signal with the audio signal in the memory.

4. The camera as claimed in claim 1 wherein the tone signal is a DTMF tone.

5. The camera as claimed in claim 1 wherein the audio signal is a fixed length audio signal.

6. The camera as claimed in claim 1 wherein the audio signal is a variable length audio signal, not to exceed a predetermined maximum memory capacity.

7. The camera as claimed in claim 1 further including an output jack for outputting the audio signal from the camera.

8. The camera as claimed in claim 1 wherein the memory is removable from the camera.

9. The camera as claimed in claim 1 wherein the memory is an analog memory.

10. The camera as claimed in claim 1 wherein the memory is a digital memory.

11. The camera as claimed in claim 1 further including a film advance mechanism for advancing the film frame by frame, and wherein the generator generates a unique identification signal dependent upon actuation of the film advance mechanism.

12. A camera for recording sound associated with images that are captured by the camera, said camera comprising:

a microphone for generating audio signals;

a memory for storing the audio signals;

a generator for generating a unique DTMF tone signal for a captured image; and a processor for embedding the unique DTMF tone signal with the audio signal in the memory.

13. The camera as claimed in claim 12 further comprising an image counter for counting each captured image, wherein the generator is responsive to the incrementing of the image counter for generating the unique DTMF tone signal for each captured image.

14. The camera as claimed in claim 12 further comprising a user input for indicating a user desire to record an audio signal, wherein the processor is responsive to the user input for embedding the unique DTMF tone signal with the audio signal in the memory.

15. The camera as claimed in claim 12 wherein the camera is a photographic camera that captures the images on frames of a photographic film.

16. The camera as claimed in claim 12 wherein the camera is a digital camera that captures and stores the images on an electronic medium.

17. A photographic system for producing prints from photographic film having sound associated with images that are captured on frames of the film, said photographic system comprising:

a camera for recording sound associated with images that are captured on frames of a photographic film, said camera comprising:

a microphone for generating audio signals;

a memory separate from the film for storing the audio signals;

a generator for generating for each film frame a unique identification signal that is synchronized to advance of the film in the camera, wherein the unique identification signal is a tone signal; and a processor for embedding the unique identification signal with the audio signal in the memory; and a photofinishing system for processing the film and producing prints therefrom, said photofinishing system comprising:

means for receiving the audio signal together with the unique identification signal embedded in each audio signal that identifies the frame to which the audio signal pertains;

a decoder for decoding the unique signal embedded in each audio signal;

a processor for associating the audio signal with a particular frame of film by reference to the decoded unique signal; and a transfer mechanism for transferring the audio signal to an output product associated with each particular frame of film.

18. The system as claimed in claim 17 wherein the unique signal is a DTMF tone signal and the decoder is a DTMF tone decoder.

19. The system as claimed in claim 17 wherein the output product associated with each particular frame of film is a photographic print.

20. The system as claimed in claim 19 wherein the transfer mechanism is a printer for printing the audio signal on the print.

21. The system as claimed in claim 17 wherein the output product associated with each particular frame of film is a playback medium.

22. The system as claimed in claim 21 wherein the transfer mechanism transfers the audio signal to a CD, cassette tape or other playable medium.

23. A photofinishing system for producing prints from captured images having sound associated therewith, said photofinishing system comprising;

means for processing the captured images and producing prints therefrom;

means for receiving a sound output, said sound output recorded as an audio signal on a memory together with a unique DTMF tone signal embedded in each audio signal that identifies the image to which the audio signal pertains;

a decoder for decoding the unique DTMF tone signal embedded in each audio signal;

a processor for associating the audio signal with a particular captured image by reference to the decoded unique DTMF tone signal; and a transfer mechanism for transferring the audio signal to an output product associated with each particular captured image.

24. The system as claimed in claim 23 wherein the output product associated with each particular captured image is a photographic print.

25. The system as claimed in claim 24 wherein the transfer mechanism is a printer for printing the audio signal on the print.

26. The system as claimed in claim 23 wherein the output product associated with each captured image is a playback medium.

27. The system as claimed in claim 26 wherein the transfer mechanism transfers the audio signal to a medium selected from the group including a CD, cassette tape or other playable medium.

28. The system as claimed in claim 23 wherein the captured images are captured on the frames of a photographic film.

29. The system as claimed in claim 23 wherein the captured images are captured and stored the images on an electronic medium.

30. A method for recording sound associated with images comprising the steps of:

generating audio signals;

storing the audio signals in a memory;

generating a unique tone signal for a captured image; and embedding the unique tone signal with the audio signal in the memory.

31. A method as claimed in claim 30 wherein the step of generating a unique tone signal comprises generating a unique tone signal for each captured image.

32. A method as claimed in claim 31 wherein the step of generating audio signals comprises generating audio signals for fewer than each of the captured images.

33. A method as claimed in claim 30 wherein the unique tone signal is a DTMF tone signal.

* * * * *